United States Patent Office 2,973,048
Patented Feb. 28, 1961

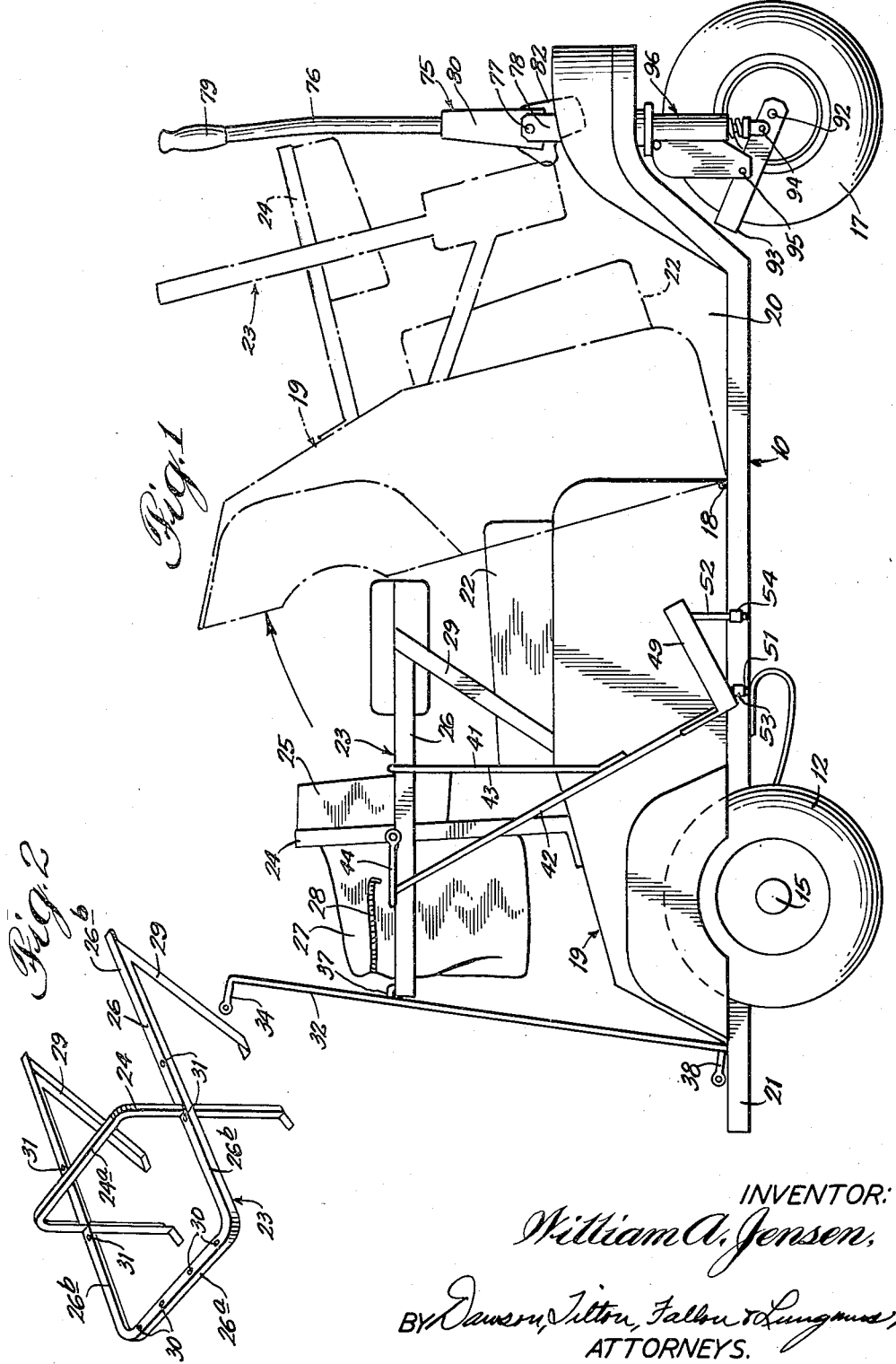

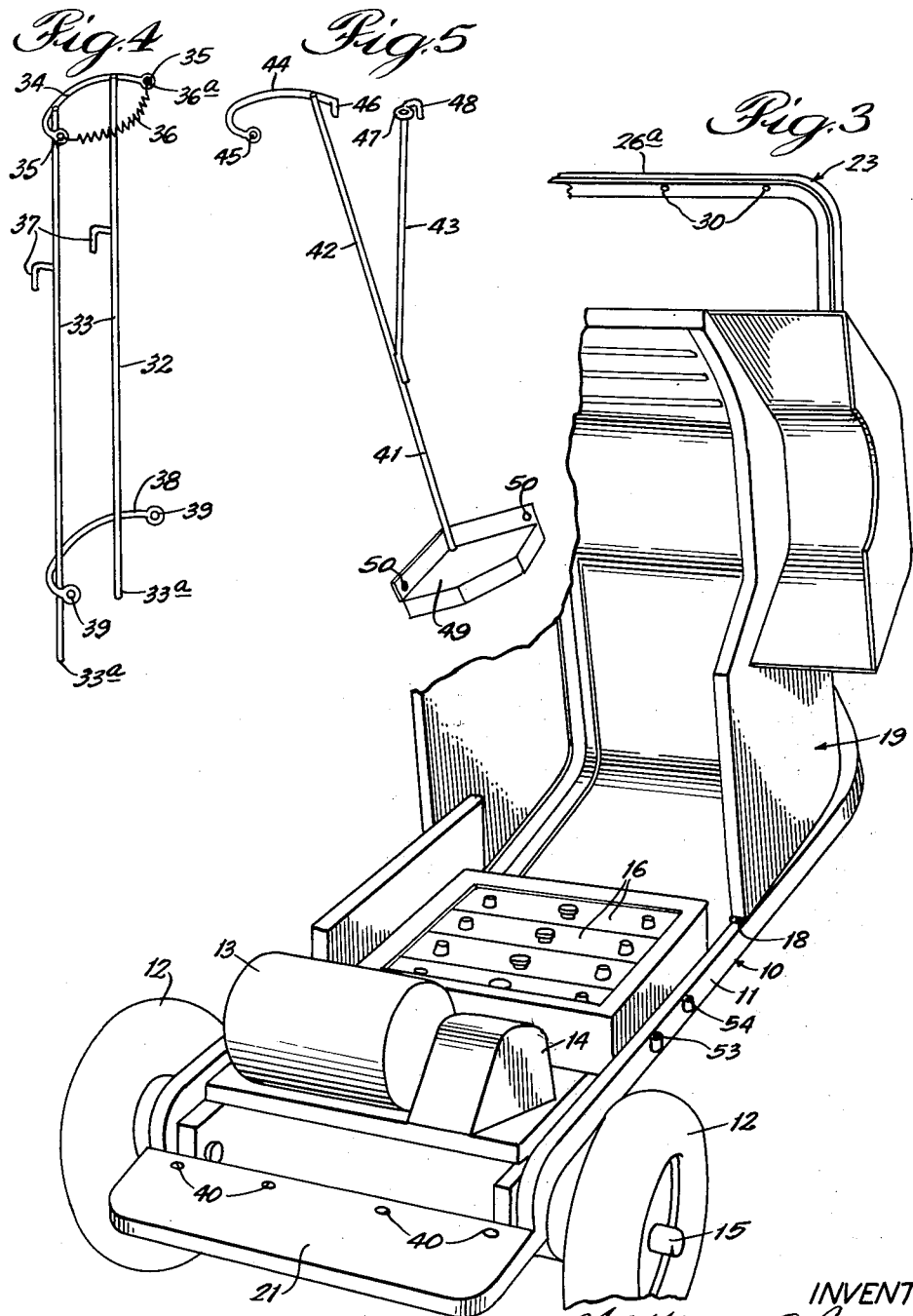

2,973,048

THREE WHEELED MOTORIZED GOLF VEHICLE

William A. Jensen, Box 278, Addison, Ill.

Filed Jan. 6, 1959, Ser. No. 785,281

5 Claims. (Cl. 180—27)

This invention relates to a golf vehicle, and, more particularly, to a self-propelled vehicle for transporting golfers and their equipment about golf courses.

This application is related to my copending application, Serial No. 654,162, filed April 22, 1957, now Patent No. 2,918,134.

It is an object of this invention to provide a novel golf vehicle in which a chassis and body cooperate to provide supporting means both for the golfer and his equipment. Another object is to provide a golf vehicle in which one or more golf bags can be conveniently transported while yet affording room for additional standing riders.

Other specific objects and advantages of this invention can be seen as this specification proceeds.

The invention, in an illustrative embodiment, will be described in conjunction with the accompanying drawings, in which—

Fig. 1 is a side elevational view of a golf vehicle embodying teachings of this invention with the body portion shown both in solid line and broken line, the broken line showing being representative of the body's position when it is pivoted upwardly to permit access to the means for propelling the vehicle;

Fig. 2 is a reduced size perspective view of a framework superstructure of the vehicle;

Fig. 3 is a fragmentary perspective view of the vehicle seen in Fig. 1 and with the body portion shown in the position corresponding to the dotted line representation in Fig. 1;

Fig. 4 is a perspective view of one of the bag racks seen in Fig. 1; and

Fig. 5 is a view similar to Fig. 4 and showing another bag rack shown in Fig. 1.

In the illustration given, the numeral 10 designates generally the chassis of a vehicle adapted to transport golfers and their equipment about golf courses. The chassis 10 includes a frame 11 which rotatably supports a pair of rear wheels 12. The rear wheels are driven by an electric motor 13 coupled as at 14 by means of belts and pulleys (not shown) to the rear axle 15 upon which the rear wheels 12 are mounted.

The motor 13 derives electric power from a plurality of batteries 16, as can be seen in Fig. 3.

As best seen in Fig. 1, the chassis 10 also includes a front wheel 17 which is pivotally mounted on the chassis 10 and which is adapted to be pivoted through a wide arc for changing the direction of advance of the vehicle. Pivotally mounted on frame 11 as at 18 (designated only in Fig. 3) is a body generally designated by the numeral 19 which, as shown in Fig. 1, can be pivoted upwardly to permit access to the batteries, motor, drive, etc.

The body 19, as can be best seen in Fig. 1, occupies only an intermediate portion of the length of frame 11, terminating a spaced distance rearwardly of front wheels 17 to provide a foot-resting space 20. The body 19 also terminates a spaced distance from the rear end of the frame 11 to provide a running-board 21 (best seen in Fig. 3). The body 19 is generally rectangular in nature and is equipped with a seat 22 provided on the upper forward surface. The body 19 also rigidly carries a superstructure or subframe designated generally by the numeral 23, which is shown in perspective view detached from the body in Fig. 2. The subframe 23 includes a generally U-shaped member 24 which is substantially vertically disposed. As seen in Fig. 1, the member 24 is angled slightly to the vertical so as to provide an inclined back support, the member 24 being equipped with a back-rest 25. Also providing part of subframe 23 and secured to the U-shaped member 24 a spaced distance below the base 24a of the U, is a second U-shaped member 26 which is in essence forwardly directed. The base 26a of the U-shaped member 26 is also spaced from the member 24 in the same fashion as the base 24a of member 24 is spaced from member 26. Supported between the base 26a of member 26 and member 24 is a bag 27 (seen only in Fig. 1). Bag 27 may be equipped with a zipper as at 28 and provides a receptacle for the transport of lunch, weather gear, etc.

The subframe 23 is also equipped with a pair of downwardly and rearwardly-inclined legs 29, which extend from the forward ends of member 26 to the body 19.

The subframe 23 is equipped with four openings 30 in the base 26a of member 26, and also equipped with a pair of openings 31 in each arm 26b of member 26. The openings 30 are equally spaced apart and thus, in effect, provide three pairs of openings. Mounted in one pair of openings 30 is a bag rack 32 (seen in elevation in Fig. 1 and in perspective in Fig. 4). The bag rack 32 is seen to include a pair of longitudinally-extending rods 33 connected at their upper ends by an arcuate cross member 34, the cross member 34 being equipped at its ends with openings 35 which support a spring 36. The spring 36 is equipped with hooks at the ends as at 36a which permit detachment of the spring 36 from the cross member 34. This permits the positioning of a golf bag against the cross member 34 and when the spring 36 has been reconnected, the spring urges the bag (not shown) against the cross bar and against the bag rack 32 in general. The longitudinally-extending rods 33 are each equipped with an L-shaped lug 37 which are received in the openings 30.

A second cross member 38 is provided adjacent to, but spaced from, the bottom ends of the longitudinal members 33. As is the case with the cross member 34, the cross member 38 is equipped at its ends with openings 39, which may receive a spring similar to that designated 36 and shown in connection with the cross member 34. The lower ends 33a of the longitudinal rod 33 are received within the openings 40 in the running-board 21 of chassis 10.

Because of the equal spacing of the openings 30 in portion 26a of the member 26, the openings 40 being similarly spaced, it is possible to position bag rack 32 in any adjacent pair of the generally vertically-aligned, vertically-extending openings 30 and 40. For example, where two golf bags are to be carried, two racks 32 can be employed, utilizing all four openings in the portion 26a and the running-board 21. Where only one bag is to be carried, the bag rack 32 can be positioned in the central part of the four openings 30 and 40 associated with member 26 and running-board 21, respectively.

The spacing of the openings as described above not only permits the flexibility in operation through the convenient repositioning of the bag rack 32, but also provides ready hand gripping space on portion 26a for a caddy or other rider standing on the running-board 21.

Still further, the bag rack 32 serves as a locking means for securing the body 19 in its down position. Before the body 19 can be pivoted to the dotted line position seen in Fig. 1, or its position of Fig. 3, it is first necessary for the bag racks 32 to be detached from their mountings in the sub-frame 23 and the chassis 10. Thus, in effect, the bag racks connect and lock together the body and the chassis.

Extra bags can be conveniently carried through the employment of another bag rack designated by the numeral 41 and which is seen in perspective view in Fig. 5. Where, for example, the vehicle is employed to transport all four bags of a foursome, two bags can be stationed in bag racks 32 at the rear of the vehicle, and one each can be stationed in the bag racks 41 along the two sides of the vehicle. The bag rack 41, like the bag rack 32, includes an essentially elongated framework made up of rods 42 and 43. The rod 42 is equipped with an arcuate arm 44 having at one unattached end an opening 45 adapted to receive the hook of a spring (not shown) similar to that seen in Fig. 4 and designated by the numeral 36. The other unattached end of arm 44 is equipped with a depending lug 46 positionable in the rear opening 31 of the pair of openings in the sides 26b of member 26. The rod 43 is also equipped with an opening 47 which receives the other end of a chain or spring useful in urging a golf bag against the crossarm 44 and the rod 43 is equipped with a depending lug 48 which is receivable within the forward opening 31 in portion 26b, all of which can be appreciated from a consideration of Fig. 1.

The bag rack 41 is equipped at its lower end with a transverse base or plate 49, which is adapted to receive the bottom of a golf bag and support the same. The base 49 is equipped with a pair of openings 50 which again are adapted to receive a resilient member such as a spring to immobilize a golf bag by urging it against the elongated framework of the bag rack. As best seen in Fig. 1, the base 49 is equipped with a pair of depending legs, of rod-like form, designated by the numerals 51 and 52 which are received, respectively, within sleeve elements 53 and 54 (best seen in Fig. 3) provided on the outer side of the frame 11. Thus, the bag rack 41 also serves to releasably lock the body 19 to the chassis 10 and the vehicle operator can choose which type of bag rack to use. It may be the preference of some to have the bag positioned essentially vertically at the rear of the vehicle, or the preference of others to have the bag cocked at about a 60° angle along the side of the vehicle. Where four bags are to be carried, the bags are all conveniently accessible, yet do not interfere with the vehicle operator in alighting and departing from the vehicle. Still further, the bag rack arrangement permits the carrying of additional riders on the rear running-board, if desired.

When the body 19 is pivoted to the position seen in dotted line in Fig. 1, the bag racks 32 and 41 having been previously detached, access to the batteries 16 is achieved, as can be appreciated from a consideration of Fig. 3. In Fig. 3, it is seen that the frame 11, suitably equipped with cross braces (not shown), provides a chamber or supporting space for the receipt of batteries 16.

The forward end of the chassis 10 is equipped with a control mechanism generally designated 75 and which can be best seen in Fig. 1. The control mechanism 75 includes a steering handle 76 which is pivotally mounted as at 77 on a yoke 78, the yoke 78 being journaled for rotation in frame 11. The steering handle 76 is equipped with a motorcycle handle grip 79, the rotation of which actuates electric motor 13 through electric switch means (not shown) and housed within connection box 80 (see Fig. 1). The control mechanism 75 also includes cams 82.

Supporting the front axle 92 is a U-shaped member or yoke 93. In turn, the U-shaped member 93 is supported at 94 and 95 by the major yoke generally designated 96.

In the operation of the vehicle just described, the vehicle will ordinarily be stored prior to use adjacent the clubhouse or other building containing services facilities of a golf course. In this condition, the bag racks 32 and 41 may be attached so that convenient access may be had to the batteries 16 for servicing, recharging, etc. When the vehicle is to be used, the requisite number of bag racks 32 and 41 can be applied to securely lock the body 19 in place on chassis 10. The bag racks not only provide a positive lock by having lug portions connecting both the U-shaped member 26 and the frame 11, but the weight of the golf bags further stabilizes the bag racks in place. The golf bags (not shown) are securely maintained in place through the use of the springs 36 (seen only in Fig. 4).

The vehicle so equipped is thereafter propelled thence by a golfer through manipulation of the handle grip 79. This may be done either from a seated position on seat 22, in which case the handle is rotated through a vertical arc toward the rear of the vehicle. Alternatively, the steering handle 76 can be pivoted forwardly through a vertical arc and the golfer walk in front of the vehicle.

While, in the foregoing specification, I have set forth a detailed description of an embodiment of the invention for the purpose of explaining the same, it will be understood by those skilled in the art that numerous changes in the details herein given may be made without departing from the spirit and scope of the invention.

I claim:
1. In a vehicle of the character described, a chassis having a body mounted thereon adjacent the rear of the chassis, said body being generally rectangular in nature and being spaced inwardly of the side and rear edges of said chassis, a frame secured to said body, said frame being equipped with a forwardly-directed, generally U-shaped member parallel to said chassis and spaced thereabove, a plurality of pairs of vertically-extending openings in said member and a similar plurality of pairs of vertically-extending openings provided in said chassis outward of said body, and at least one golf bag rack releasably mounted on said member and chassis, said rack comprising an elongated framework equipped with spaced-apart opening-engaging means adjacent both ends thereof.

2. The structure of claim 1 in which the rearmost portion of said U-shaped member provides a base, said member openings being provided in said base and being equally spaced apart, said chassis openings being aligned with said member openings whereby three separate bag-carrying positions are provided.

3. The structure of claim 1 in which said rack framework is equipped with a transverse plate adjacent the bottom thereof and equipped with a transverse arm adjacent the top thereof, and resilient bag-immobilizing means extending between the unattached end of said arm and said framework, said rack being positioned along a side of said body.

4. In a self-propelled vehicle for transporting golfers and their equipment about golf courses, a chassis including a pair of driven rear wheels rotatably mounted thereon and a front wheel rotatably and pivotally mounted thereon, a body mounted on said chassis over said rear wheels and terminating a spaced distance from said front wheel, a seat mounted on the upper front surface of said body, a frame secured to the upper surface of said body extending rearwardly and sidewardly of said seat, said frame including an inverted U-shaped upright member and a forwardly-facing U-shaped transverse member secured to said upright member a spaced distance above said seat and generally parallel thereto, the upright member being equipped with a base portion positioned above said transverse member and said transverse member being equipped with a base portion rearward of said upright member, a plurality of bag racks detachably connected between the base portion of said transverse member and said chassis rearward of said body, and backrest means secured to said upright member.

5. In a self-propelled vehicle for transporting golfers and their equipment around golf courses, a chassis including a pair of driven rear wheels rotatably mounted thereon and a steerable front wheel mounted thereon, a body pivotally secured to said chassis intermediate said front and rear wheels, said body being spaced inward of the side and rear edges of said chassis but extending rearward of said rear wheels, a seat on said body adjacent the forward end thereof, a frame extending upward from and connected to said body providing support for back and arm rests and a bag-holding rack, said frame comprising a generally U-shaped member oriented in inverted, vertical position transverse of said body, a second generally U-shaped member oriented generally horizontally with the open portion of the U disposed forwardly, said second member being interconnected to the first-mentiond member with the closed portion of the second member U positioned rearward of said first-mentioned member and the closed portion of the first-mentioned member U positioned above said second member, a plurality of openings in said second member and a similar plurality of openings in said chassis outward of said body, said pluralities of openings being arranged to receive lugs adjacent opposite ends of a bag rack, and a bag rack comprising a vertically disposed, elongated framework equipped with bag-securing means and opening-engageable lugs adjacent the upper and lower ends thereof, said bag rack, when installed on said second member and chassis, serving to stabilize said body against pivotal movement.

References Cited in the file of this patent

UNITED STATES PATENTS

| | | |
|---|---|---|
| D. 170,834 | Rogant | Nov. 10, 1953 |
| 2,237,677 | Lewis | Apr. 8, 1941 |
| 2,468,801 | Beall | May 3, 1949 |
| 2,822,969 | Cooper | Feb. 11, 1958 |
| 2,844,209 | Brunderman | July 22, 1958 |
| 2,865,656 | Musgrave | Dec. 23, 1958 |